(12) United States Patent
Pelletier et al.

(10) Patent No.: US 7,711,224 B1
(45) Date of Patent: May 4, 2010

(54) COLORLESS MULTICHANNEL TUNABLE DISPERSION COMPENSATOR

(75) Inventors: François Pelletier, Saint-Augustin-de-Desmaures (CA); Martin Lapointe, Saint-Augustin-de-Desmaures (CA); Simon Savard, Québec (CA)

(73) Assignee: Teraxion Inc., Quebec (CA)

( * ) Notice: Subject to any disclaimer, the term of this patent is extended or adjusted under 35 U.S.C. 154(b) by 0 days.

(21) Appl. No.: 12/209,779

(22) Filed: Sep. 12, 2008

Related U.S. Application Data (60) Provisional application No. 60/960,092, filed on Sep. 14, 2007.

(51) Int. Cl.
*G02B 6/34* (2006.01)
*H04J 14/02* (2006.01)

(52) U.S. Cl. .............................. 385/37; 385/15; 385/24; 385/27; 385/31; 385/123; 398/81; 398/87

(58) Field of Classification Search .................. 385/15, 385/24, 27, 31, 37, 123, 122; 398/81, 87
See application file for complete search history.

(56) References Cited

U.S. PATENT DOCUMENTS

| | | | |
|---|---|---|---|
| 6,498,891 B1 | 12/2002 | Montesanto et al. | 385/134 |
| 6,707,967 B2 | 3/2004 | Rothenberg et al. | 385/37 |
| 6,842,567 B2 | 1/2005 | Lachance et al. | 385/37 |
| 6,847,763 B2 * | 1/2005 | Eggleton et al. | 385/37 |
| 6,879,755 B2 | 4/2005 | Morin et al. | 385/37 |
| 6,904,196 B1 * | 6/2005 | Sorin et al. | 385/27 |
| 6,907,164 B2 | 6/2005 | Lachance et al. | 385/37 |
| 6,922,506 B2 * | 7/2005 | Gagnon | 385/37 |
| 6,937,793 B2 | 8/2005 | Lelievre et al. | 385/37 |
| 6,941,044 B2 | 9/2005 | Painchaud et al. | 385/37 |
| 7,050,671 B1 * | 5/2006 | Zhang et al. | 385/27 |
| 7,068,884 B2 | 6/2006 | Rothenberg | 385/37 |
| 2002/0048430 A1 | 4/2002 | Hashimoto et al. | 385/37 |
| 2004/0114863 A1 * | 6/2004 | Eggleton et al. | 385/37 |

OTHER PUBLICATIONS

U.S. Appl. No. 11/372,454, filed Mar. 8, 2006, Painchaud et al.
F. Ouellette, "Dispersion Cancellation Using Linearly Chirped Bragg Grating Filters in Optical Waveguides", Opt. Lett., 12, pp. 847-849, 1987.

* cited by examiner

*Primary Examiner*—Brian M Healy
(74) *Attorney, Agent, or Firm*—Brinks & Hostetler LLP (57) ABSTRACT

A colorless tunable dispersion compensator for compensating for chromatic dispersion in a multi-channel light signal is provided. The compensator includes a multi-channel Bragg grating extending along a waveguide. Dispersion tuning means, such as a temperature gradient inducing device, are provided for tuning the dispersion characteristics of the wavelength channels. Wavelength shifting means are also provided for uniformly shifting the central wavelengths of all channels independently of their dispersion characteristics. A uniform temperature inducing or strain applying assembly can be used for this purpose.

16 Claims, 5 Drawing Sheets

COLORLESS MULTICHANNEL TUNABLE DISPERSION COMPENSATOR

CROSS-REFERENCE TO RELATED APPLICATIONS

This application is a non-provisional of provisional patent application 60/960,092 filed Sep. 14, 2007, the entire contents of which are incorporated herein by reference.

FIELD OF THE INVENTION

The present invention relates to chromatic dispersion compensation in optical signals and more specifically concerns a multi-channel tunable dispersion compensator which may be used with any desired transmission wavelength.

BACKGROUND OF THE INVENTION

In high speed optical telecommunication systems, one of the many technological challenges encountered is the chromatic dispersion induced in light signals propagating over long distances in optical media such as optical fibers. Chromatic dispersion causes light pulses to spread out as they travel along an optical fiber. Chromatic dispersion occurs because different spectral components in a light pulse travel at slightly different speeds. An optical pulse, including several different optical spectral components can therefore be broadened or distorted in shape after propagation through a sufficiently long distance in a dispersive optical medium. This dispersion effect can be undesirable and even adverse for certain applications such as optical communication systems where information is encoded, processed, and transmitted through optical pulses. As the pulses spread, they can overlap and interfere with each other, thereby impacting signal integrity and limiting the transmission bit rate, the transmission bandwidth, and other performance factors of the optical communication systems. This effect becomes even more pronounced at higher data rates, where subsequent light pulses are closer to each other.

Pulses at different wavelengths typically suffer different amounts of dispersion. The chromatic dispersion in standard single-mode optical fiber is nominally 17 ps/(nm·km) in the 1550 nm telecommunication window, but this value changes as a function of the wavelength: its value changes by about 2 ps/(nm·km) between 1530 nm and 1565 nm.

A known method for the correction of dispersion in optical fiber is the use of Fiber Bragg gratings (FBGs), a well-established technology for optical telecommunications. Basically, a Bragg grating allows light propagating into an optical fiber to be reflected back when its wavelength corresponds to the grating's Bragg wavelength, related to its period. A chirped FBG, in which the grating period varies along the fiber axis, represents a well-known solution for compensating the chromatic dispersion of an optical fiber link (F. Ouellette, "Dispersion Cancellation Using Linearly Chirped Bragg Grating Filters in Optical Waveguides", Opt. Lett., 12, pp. 847-849, 1987). Such a grating compensates for the accumulated dispersion since the group delay varies as a function of the wavelength. An appropriate grating can be fabricated such that the wavelength dependence of its group delay is just the opposite of that of the fiber link.

In order to improve the versatility of dispersion compensating devices, it is known to provide means for changing the group delay induced by a Bragg grating, therefore tuning the dispersion characteristics of the device. This can for example be achieved by applying a temperature gradient to optical fiber, locally changing the temperature of the grating to affect its reflectivity characteristics. A practical and power efficient assembly for applying such a temperature gradient to a fiber Bragg grating is shown in assignee's U.S. Pat. No. 6,842,567 (LACHANCE et al). The temperature gradient is produced in a heat conductive element, with which the grating is in continuous thermal contact, by elements controlling the temperature of the ends of the heat conductive element, thereby applying the temperature gradient to the grating. A heat recirculation member may be provided to allow the recirculation of heat between the two ends of the heat conductive elongated element. Isolation from the surrounding environment may also be provided in order to decouple the desired temperature gradient from ambient temperature fluctuations. Different manners of using such an assembly are further disclosed in assignee's U.S. Pat. Nos. 6,937,793 (LELIÈVRE et al), 6,941,044 (PAINCHAUD et al).

Although prior art technologies enable the tuning of the dispersion characteristics of a dispersion compensator on a global or channel-per-channel basis, their specifications are provided with respect to a fixed grid of wavelength channels. This limitation has lead to the use of multiple components to cover the narrower channel spacing currently in use.

Recent driving forces in telecom systems markets have pushed manufacturers to lower their manufacturing cost and thus limit the number of configuration and wavelength dependent material they use and produce. One current problem they face is that commercially available tunable dispersion compensators have a fixed wavelength response due to the intrinsic nature of tunable solutions. Thus, current products are unable to fulfill the need for a 50 GHz grid spacing of true random central wavelength, or have limited tuning range on larger grid spacing.

There is therefore a need for a true colorless tunable dispersion compensator which maybe used in addressing any wavelength, not necessarily on a predefined pattern or grid, over a complete wavelength band of operation.

SUMMARY OF THE INVENTION

In accordance with the present invention there is therefore provided a colorless tunable dispersion compensator for compensating for chromatic dispersion in multi-channel light signal propagating along a waveguide.

The compensator first includes a Bragg grating extending along a waveguide. The Bragg grating has a spectral response which includes a plurality of wavelength channels. Each wavelength channel has a central wavelength and dispersion characteristics.

Dispersion tuning means are provided for tuning the dispersion characteristics of the wavelength channels. In addition, wavelength shifting means are further provided for uniformly shifting the central wavelengths of all of the wavelength channels independently of their dispersion characteristics.

In accordance with one further aspect of the invention, there is also provided a colorless tunable dispersion compensator for compensating for chromatic dispersion in a light signal, the compensator including the following components:
  a Bragg grating extending along a waveguide, the Bragg grating having a spectral response which includes a plurality of wavelength channels, each wavelength channel having a central wavelength and dispersion characteristics;
  a thermal gradient assembly for inducing a thermal gradient along the waveguide containing the Bragg grating; and a strain applying assembly for applying a uniform strain along the waveguide containing the Bragg grating.

Chromatic dispersion compensators according to embodiments of the present invention may use a wavelength shift of the spectral response of the entire grating to cover any wavelength in between the multiple channels pattern of typical light signals, in combination with a change in the dispersion of the grating. In some embodiments those combined two degree of freedom used over multi-channel FBGs may provide the coverage of any dispersion and central wavelength of operation with respect to the FBG design.

Other features and advantages of the present invention will be better understood upon reading of preferred embodiments thereof with reference to the appended drawings.

DESCRIPTION OF PREFERRED EMBODIMENTS OF THE INVENTION

The present invention relates to dispersion compensators, for example of the type that can be used in telecommunication applications.

The term "dispersion compensator" is used herein to refer to a device which is designed to induce a predetermined chromatic dispersion in a light signal propagating therein. In typical applications, the chromatic dispersion induced by a compensator is opposite to the chromatic dispersion experienced by the light signal as it traveled or propagates along a waveguide.

The expression "chromatic dispersion" refers to the spreading of a light pulse as it travels along a dispersive medium resulting from the fact that light at different wavelengths travels at slightly different speeds. Dispersion compensators according to embodiments of the invention are particularly adapted to compensate for chromatic dispersion in multi-channel light signals. An example of application of such compensators is for Wavelength-Division-Multiplexing (WDM) communication systems, in which the transmitted information is encoded in light pulse using different wavelength channels. A multi-channel light signal is therefore a light beam susceptible to carry information in one or more wavelength channels within a predetermined spectral band.

Figure 2:
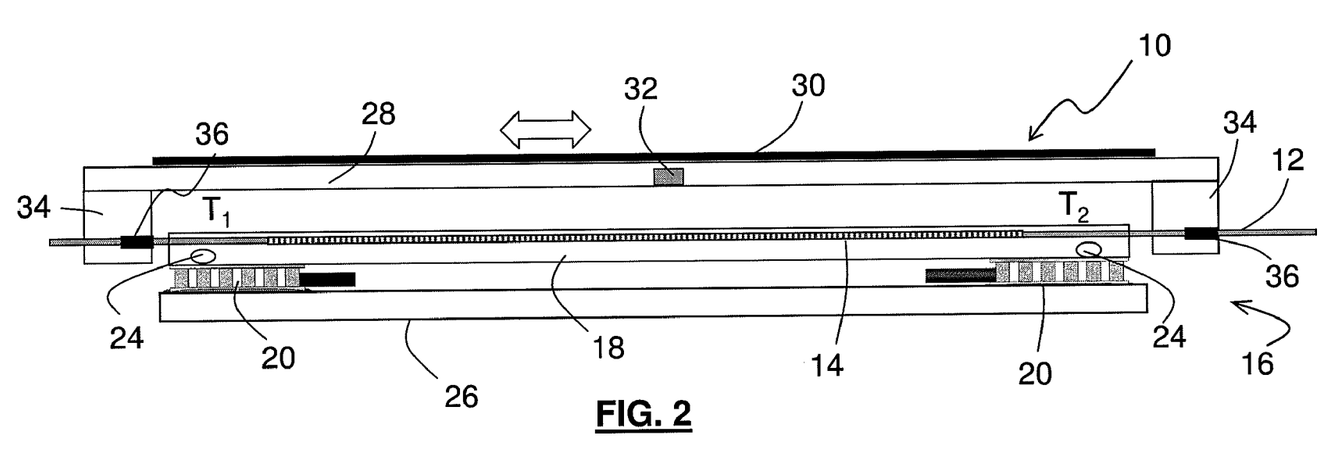
FIGS. 2 to 5 are schematic representations of dispersion compensators according to embodiments of the invention.

Referring to FIG. 2, there is shown schematically a dispersion compensator 10 according to an embodiment of the present invention.

The dispersion compensator 10 includes a Bragg grating 14 extending along a waveguide segment 12. The waveguide segment is preferably embodied by a length of optical fiber, but of course any appropriate light-guiding structures could be used such as planar or channel waveguides. These waveguides could be fabricated in a variety of host materials including silica, fluoride or chalcogenide glasses, semi-conductors, organic materials and polymers. In the case of optical fiber, the optical fiber may be single mode or multimode, with a single or multiple cladding. It may be embodied by a standard fiber, a polarisation maintaining (PM) fiber, a microstructured (or "holey") fiber or any other appropriate specialized type of fiber. It may be made of any suitable materials such as pure silica, doped silica, composite glasses or sapphire.

Throughout the present description, the expression "Bragg grating" is understood to refer to any periodic or a periodic refractive index pattern permanently induced in the waveguide segment. The Bragg grating has a spectral response which includes a plurality of wavelength channels, that is, the reflection or transmission profile of the grating as a function a wavelength shows a plurality of generally periodical features. For many applications, for example in the telecommunications industry, it is often desirable that the channels be of uniform width and spacing, as for example shown in FIG. 1A, but the present invention could equally be applied to cases where it is not so. Each wavelength channel has a central wavelength and dispersion characteristics. The central wavelength of a channel is defined as its reference wavelength. It is determined depending on predetermined factors and, in practice, is not necessarily at the center of the channel. In the telecom industry, the central wavelength of a channel is often defined as the wavelength corresponding to the average −3 dB bandpass frequency. The average −3 dB bandpass frequency is equal to $(f_1+f_2)/2$, where $f_1$ is the −3 dB frequency at the lower edge of the bandpass and $f_2$ is the −3 dB frequency at the upper edge of the bandpass. The center wavelength is equal to $2\lambda_1\lambda_2/(\lambda_1+\lambda_2)$, where $\lambda_1$ is the wavelength at the lower edge of the bandpass, and $\lambda_2$ is the wavelength at the upper edge of the bandpass.

The expression "dispersion characteristics" of the Bragg grating refers to any feature of the gratings introducing a group delay, usually expressed in picoseconds (ps), in the reflected light which can vary from channel to channel (interchannel variation) or within a channel itself (intrachannel variation). The variation of the group delay as a function of wavelength for a Bragg grating according to an embodiment of the invention is shown in FIG. 1B. The term "dispersion" is also used to refer to the variation of the group delay as a function of wavelength, i.e. the slope of the group delay, expressed in ps/nm. Complex Bragg gratings may also be used to compensate for higher order dispersion effects as known in the art. In the example of FIG. 1B, the group delay is shown to vary linearly within each channel, therefore corresponding to a constant intrachannel dispersion. Each channel is shown to have the same dispersion characteristics. Of course, one skilled in the art will understand that Bragg gratings having different dispersion characteristics both intrachannel and interchannel may also be used in the context of the present invention. Example of complex Bragg gratings and designing techniques are for example shown in U.S. Pat. Nos. 6,941,044 (PAINCHAUD et al); 6,707,967 (ROTHENBERG et al.) 7,068,884 (ROTHENBERG); and U.S. patent application Ser. No. 11/372,454 (PAINCHAUD et al.).

Referring back to FIG. 2, the dispersion compensator 10 further includes dispersion tuning means for tuning the dispersion characteristics of the wavelength channels of the Bragg grating 14. In one embodiment of the invention, the dispersion tuning means include a thermal gradient assembly 16 for inducing a temperature gradient in the waveguide 12 along the Bragg grating 14. In a preferred embodiment, this assembly is embodied by a thermal gradient inducing device (TGID) as disclosed in U.S. Pat. No. 6,941,044 (PAINCHAUD et al.), the contents of which is incorporated herein by reference. The temperature gradient is adapted to tune the dispersion characteristics of the wavelength channels of the Bragg grating 14, as will be explained further below.

The compensator 10 also includes wavelength shifting means for uniformly shifting the spectral response of the grating 14, thereby shifting the central wavelengths of all of the wavelength channels independently of their dispersion characteristics. There are two options that can be used to change the central wavelength of a FBG; either changing the overall temperature of the grating, thus changing its refractive index and proportionally impact the central wavelength of each channel, or stretch it, which will impact the strain in the grating and also uniformly shift the channels central wavelength. Either methods or a combination of the two will achieve the same result and are considered within the scope of the present invention.

More details on embodiments of both the dispersion tuning means and the wavelength shifting means are given below.

Theory of Thermal Expansion

A fiber Bragg grating consists of a periodic modulation of the index of refraction along the core of an optical fiber. This modulation can couple light between counter-propagating modes in a single mode optical fiber over a certain spectral domain. In other words, light of a proper wavelength is reflected when it encounters the refractive index modulation. In a uniform grating, the strongest reflection of light occurs at the Bragg wavelength $\lambda_B$ equal to twice the effective grating period:

$$\mu_B = 2n\Lambda \quad (1)$$

where $\Lambda$ is the spatial period of the index modulation in the fiber grating and n is the average effective refractive index of the guided mode at the position of the grating. Any environmental condition that affects either $\Lambda$ or n will thus also affect the Bragg wavelength. As it turns out, the refractive index in a typical single mode fiber increases with temperature, an effect known as the thermo-optic effect.

Likewise, the period of the index modulation $\Lambda$ increases with temperature as a result of thermal expansion. These two effects combine to produce an increase of the Bragg wavelength with temperature, a situation described mathematically by the following equation:

$$\frac{\Delta \lambda_B}{\lambda_B} = \alpha_f \Delta T + \xi \Delta T \quad (2)$$

where $\alpha_f$ is the coefficient of thermal expansion of the fiber and $\xi$ is the thermo-optic coefficient. The first term on the right hand side of the equation thus represents the change in the modulation period resulting from the thermal expansion, whereas the second one represents the effect of the change in the refractive index with temperature. Typical values for a silica fiber are $\alpha_f = 5 \times 10^{-7}/°$ C. and $\xi = 7 \times 10^{-6}/°$ C. The net temperature dependence of the Bragg wavelength for a grating written in a typical silica-based fiber is thus about +10 pm/° C. around the 1550 nm band and is primarily due to the change in n with temperature.

The Bragg wavelength also increases when the fiber is stretched under the action of a tensile load, leading to an increase in the modulation period $\Lambda$. This increase is partially offset by an ensuing reduction in the refractive index n through the stress-optic (or photo-elastic) effect. This situation is described by the following equation:

$$\frac{\Delta \lambda_B}{\lambda_B} = \Delta \varepsilon - p_e \Delta \varepsilon \quad (3)$$

where $p_e$ is the photo-elastic constant and $\Delta \varepsilon = \varepsilon L/L$ is the longitudinal strain in the fiber resulting from the applied tensile load, L being the fiber length. The first term on the right hand side of the equation represents the change in the modulation period resulting from the elongation of the fiber, whereas the second one represents the change in the average refractive index resulting from the photo-elastic effect. A typical value for the photo-elastic constant $p_e$ in a germano-silicate fiber is approximately 0.22, leading to a Bragg wavelength sensitivity of 1.2 pm/microstrain at 1550 nm.

Equations (2) and (3) describe the shift in the resonance wavelength of an unpackaged/free standing FBG resulting from a temperature variation or an applied load.

Temperature Gradient

With reference to FIG. 2, a temperature gradient inducing device 16, hereafter TGID, for use in the present embodiment of the present invention is shown. The Bragg grating 14 as defined above is provided in a length of optical fiber 12, embodying the waveguide. The optical fiber 12 is preferably in close proximity with an elongated heat conductive member called herein the natural gradient rod 18. This rod, preferably made out of a good metallic conductor, allows a uniform heat transfer along its length and thus creates a temperature gradient along adjacent fiber 12 when the opposite extremities of the rod 18 are maintained at different temperatures. The fiber can be coupled to this rod by numerous means, using for example a lateral groove with a thermal compound to improve thermal contact. In a preferred embodiment, the optical fiber 12 is positioned in the rod 18 such that the portion of the fiber containing the Bragg grating 14 is located at the center of the length of the rod 18.

In the illustrated embodiment the natural gradient rod 18 is shaped as a thin cylindrical tube, preferably made of a heat conductive metal, with a small hole along its longitudinal axis into which the fiber 12 rests under tension. This preferred embodiment isolates the fiber 12 from surrounding perturbations. Moreover, the optical properties of the Bragg grating 14 remain unaffected by the contact between the optical fiber 12 and the natural gradient rod 18. Within this preferred embodiment, the fiber 12 remains unaffected by the thermal expansion (or contraction) of the metallic rod 18, since they are not mechanically coupled to one another.

The natural gradient rod 18 is preferably thermally isolated from the surroundings in order to ensure the linearity of the induced thermal gradient. An outer tube (not shown) concentric with the natural gradient rod could be used to maintain a stable environment and avoid perturbation of the gradient. This tube can be maintained above the maximal operation temperature to stabilize the air temperature at any exterior temperature condition.

Two heat pumping elements 20 are coupled to the natural gradient rod on either sides of the Bragg grating, in any manner allowing heat transfer between the natural gradient rod and each respective heat pumping device. In the illustrated embodiment, the heat pumping devices are fixed in close physical contact at two points located at respective ends of the natural gradient rod 18, using an appropriate method like pressure mounting with a thermal compound, thermal gluing, or soldering. The heat pumping elements 20 are preferably Peltier effect Thermo Electric Coolers, referred hereafter as TECs. These elements pump heat from one side of their body to the other to fix the temperature of the extremities of the attached conductive rod 18 ($T_1$ and $T_2$), into which will settle a natural temperature gradient. In this particular approach, the temperature profile is linear. Alternatively, a non-linear profile may for example be applied by coupling the optical fiber to a succession of localized heaters mounted on a substrate. This technique is disclosed in more detail in U.S. patent application 2002/048430 (HASHIMOTO).

On top of each heat pumping element 20 is preferably fixed a temperature sensor element 24, such as a thermistor or a resistance temperature detector (RTD), in close proximity to the natural gradient rod 18. These sensors 24 are fixed in close contact with an appropriate method, using for example a thermally conductive epoxy. Signals from these sensors are used as input to a servo control system (not shown) to precisely control, that is fix and maintain, the temperature at each end of the grating. Such means for temperature control are well known in the art, comprising appropriate control electronics and drive such as TEC controllers with PID servo-control for optimum dynamic operation.

Both heat pumping element 20 are preferably directly mounted on a heat sink 26. The heat sink 26 may consist in a standard dissipative heat sink with fins or more simply in a large heat dissipation plate as shown in FIG. 2. It can even be the metallic casing of a packaged device. Alternatively, the TECs may be advantageously mounted on a thermally conductive metallic recirculation bar to improve the energy efficiency of the whole device. Such an assembly is for example shown in U.S. Pat. No. 6,842,567 (LACHANCE et al), to the present assignee.

In order to change the optical properties of the Bragg grating 14, an appropriate thermal gradient is induced in the natural gradient rod 18 by setting temperatures $T_1$ and $T_2$ at its extremities with heat pumping elements 20.

Referring to the theory of thermal expansion explained above, it will be understood that equation (2), the temperature effect, relates the change of the Bragg wavelength to a change in temperature. As a temperature gradient induces a different temperature change $\Delta T$ along the grating, the Bragg wavelength will also be affected differently, which results in a change in the chirp of the grating, allowing to modify the dispersion of the affected grating.

Reference can be made to U.S. Pat. No. 6,842,567 (LACHANCE et al) for a detailed description of this effect.

Wavelength Shifting Means

Independent from the TGID is a wavelength shifting mechanism, which applies either a uniform strain or a uniform temperature change on the optical fiber to effectively "shift" the spectral response of the grating.

As will be understood from equation (3), a uniform change in the strain applied to the optical fiber hosting the grating will uniformly affect the Bragg wavelength, therefore achieving the desired shift in the spectral response. It can be further inferred from Equation (2) above that a uniform change in temperature along the grating will have a similar result.

The wavelength shifting means may be embodied by a strain applying assembly for applying a uniform strain along the waveguide containing the Bragg grating. Preferably, the strain applying assembly includes a frame 34 having opposite ends rigidly coupled to waveguide at coupling points 36 on either sides of the Bragg grating. One skilled in the art will understand that the frame may include one or more frame elements which may be independent from one another. The fiber 12 is rigidly attached under tension to the frame 34 using appropriate means, such as for example glass solder, adhesive, mechanical crimping or standard solder combined with metallization of the fiber. Proper attachment of the fiber 12 to the frame 34 avoids long term wavelength drift. The length of the frame 34 between the two coupling points 36 can be controllably changed by an actuator coupled to the frame for this purpose. By changing the length between the coupling points 36 the fiber is stretch or compressed, thereby inducing a direct strain on the fiber and uniformly changing the central wavelengths of all the channels therein.

In the embodiment illustrated in FIG. 2, the actuator is embodied by a high thermal expansion member 28 which extends generally in parallel to the fiber 12. A heating mechanism is coupled to the thermal expansion member 28 for effecting a temperature change therein sufficient to change its length through thermal expansion. The heating mechanism may for example be embodied by a heating element 30 and RTD 32. The temperature preferably is regulated by a PID servo control (not shown).

Figure 4:
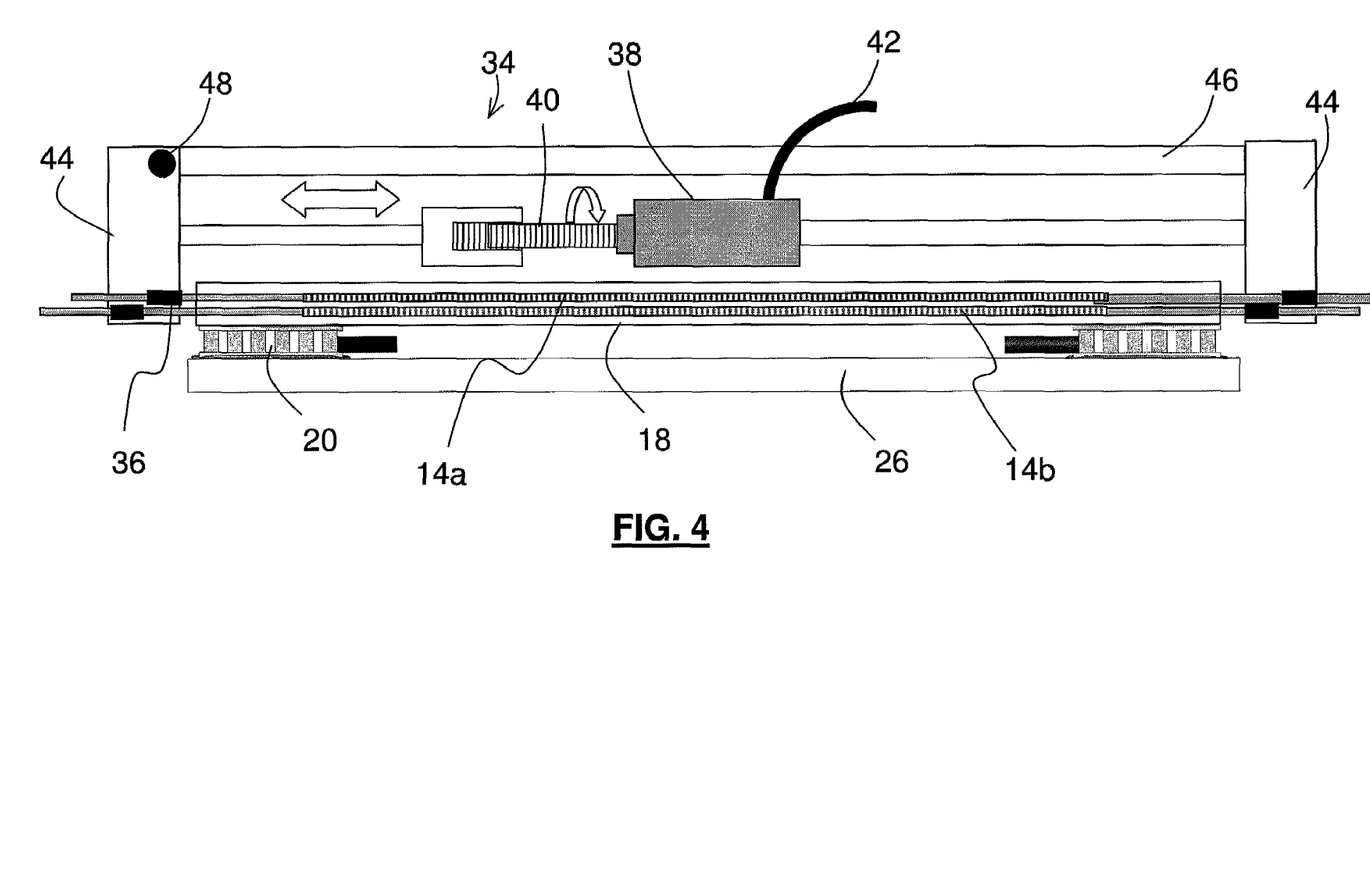

The actuator could be embodied by any other device or scheme which allows controllably changing the length of the frame 34 between the two coupling points 36. Referring to FIG. 4, there is shown such an embodiment where the actuator includes a lead screw 40 and a step motor 38 which can be electronically controlled through a control cable 42. In this embodiment, the frame includes two end walls 44 coupled to the optical fiber 1 at the coupling points 36 and a reinforcing member 46 extending therebetween and pivotally attached to one of the end walls at a pivot point 48. Alternatively, the step motor and lead screw assembly may be replaced by a piezo-electric actuator 50, such as shown in FIG. 5.

Figure 5:
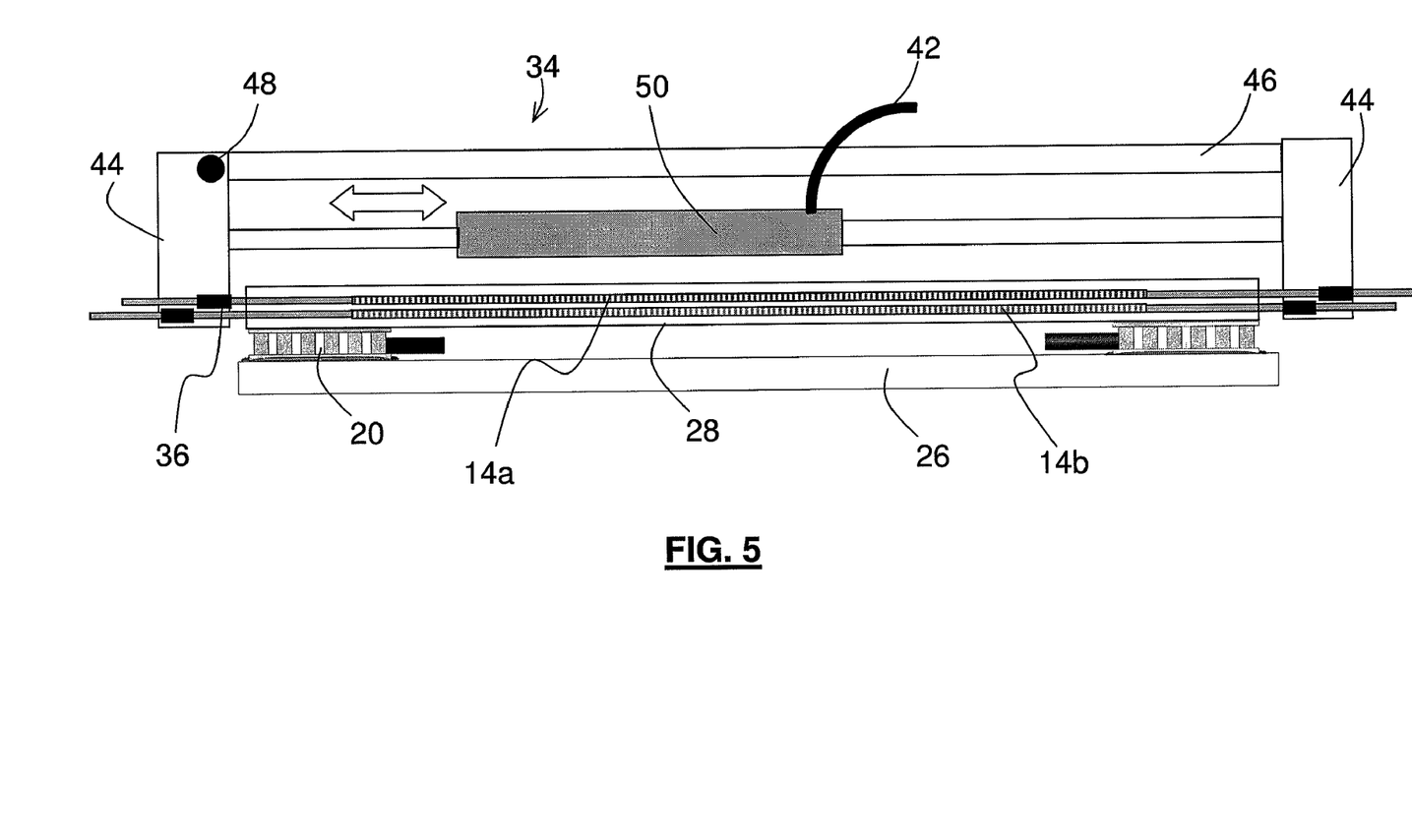

It will be noted that in the embodiments of FIGS. 4 and 5, two optical fibers are mounted in parallel within the device, preferably provided with gratings 14a and 14b having different or complementary dispersion characteristics. Such a configuration is for example shown in U.S. Pat. No. 6,937,793 (LELIÈVRE et al.)

Figure 3:
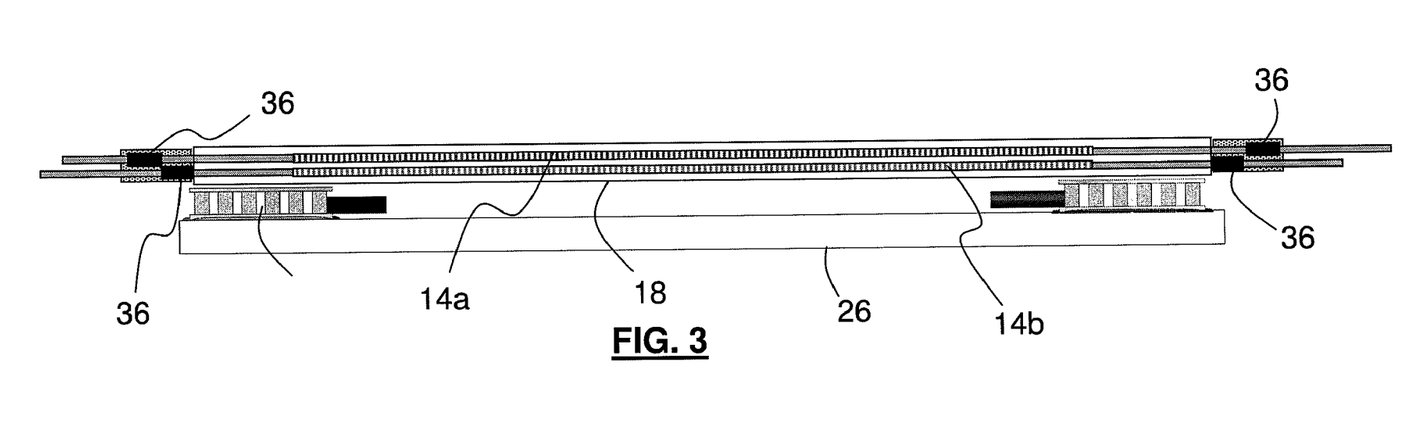

Referring to FIG. 3, there is shown another embodiment of the invention where the natural gradient rod 18 of the thermal gradient assembly and associated heat pumping elements are used to provide the wavelength shifting means. By rigidly coupling the optical fiber 12 (or fibers 12 as in the illustrated embodiment) directly to the natural gradient rod 18 and by controlling T1 and T2 to induce a temperature offset, the natural gradient rod can expand (or compress), thereby changing its length and the length of the optical fiber 12 coupled thereto. This again results in a strain being induced in the optical fiber 12. Alternatively, the optical fiber and natural gradient rod 18 may be in thermal contact without being rigidly coupled to each other, which would result in the optical fiber being heated with the natural gradient rod which again induces a change in the central wavelengths of the channels in the Bragg grating.

Figure 1A:
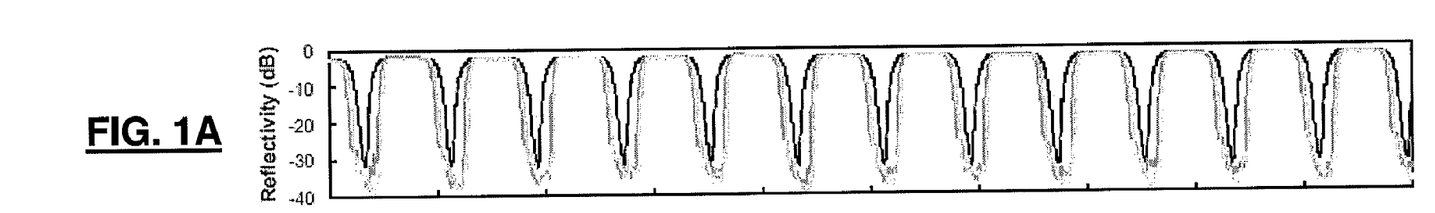
FIGS. 1A and 1B are graphs respectively showing the modification of the spectral response and of the group delay, which relates directly to the chromatic dispersion, of a grating in a compensator according to an embodiment of the present invention.
Figure 1B:
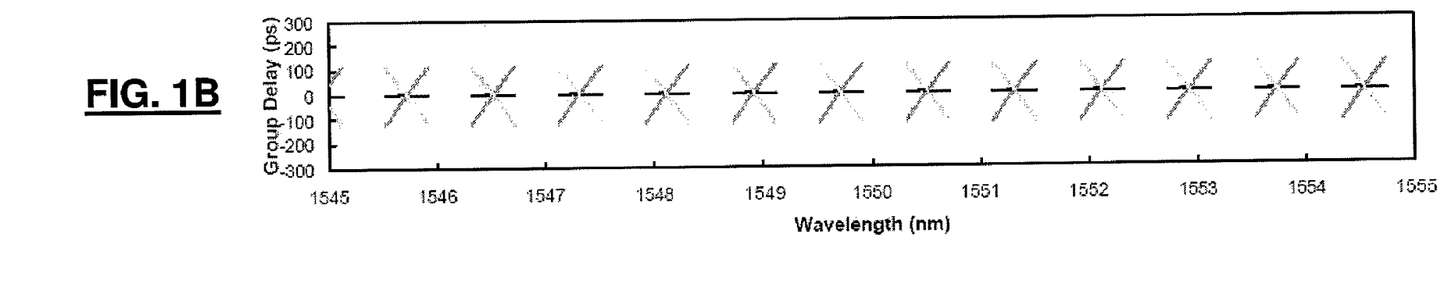
Figure 6A:
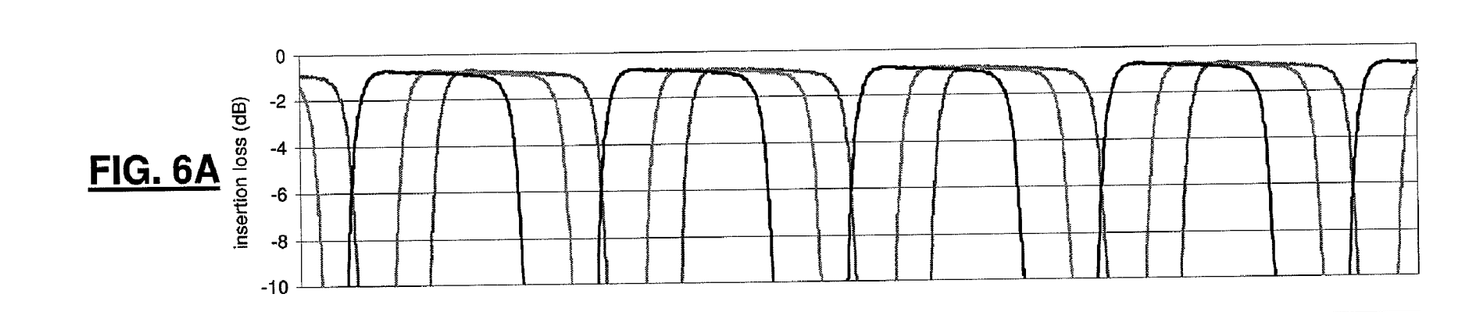
FIGS. 6A and 6B are graphs respectively showing the insertion loss and the dispersion of a grating in a compensator according to an embodiment of the present invention.
Figure 6B:
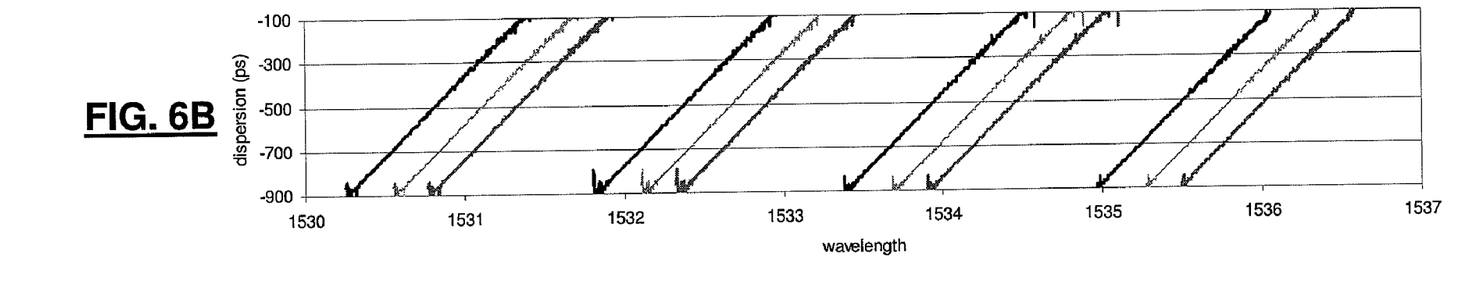

To fully cover any wavelength over the range defined between the lowest and the highest channel of FBG, the added tuning mechanism must be able to modify the wavelength of the grating over at least one channel spacing (FIG. 1). The wavelength shift of a FBG being directly proportional to the tension applied or to the temperature induced. The channel spacing width or free spectral range (FSR), of the FBG is related to the characteristics of the communication system in which it is integrated, mainly bandwidth of operation of each channel and the dispersion tuning range. The graphs of FIGS. 6A and 6B respectively show the variation in the central wavelength (as seen from the uniform shift in the reflection spectrum) and dispersion of a Bragg grating using a device according to an embodiment of the invention.

To cover this channel spacing, a simple thermal offset of the FBG could be possible over the existing thermal gradient, as explained above as an alternative to the embodiment of FIG. 3. This offset, inducing a refractive index change, would act as an independent stretcher. However, the mechanical stretching of the grating is a more viable option to modify the central wavelength of the FBG, since the thermal expansion give a limited range of tuning.

To evaluate the temperature range required for a given grating configuration, the FSR between the channels needs to be known. Typically the 40 Gbit/s systems are the most demanding in terms of channel width and therefore channel spacing. Dispersion compensation in 40 Gbit/s system requires a wide reflectivity spectrum on each channel, normally above 40 GHz, and a typical range of dispersion tuning is +/−500 ps/nm or above. When using two gratings back to back on the same platform, the multi-channel spacing required for this particular application would be above 100 GHz and preferably above 150 GHz to have better optical performances with respect to FBG design. This translates in an increase of 30-50 Celsius for a high thermal expansion metal alloy such as aluminum or copper which maintains reasonable power consumption.

Other features and advantages will be better understood upon reading of preferred embodiments thereof with reference to the appended drawings.

The invention claimed is:

1. A colorless tunable dispersion compensator for compensating for chromatic dispersion in a multi-channel light signal, the compensator comprising:
   a Bragg grating extending along a waveguide, said Bragg grating having a spectral response which includes a plurality of wavelength channels, each wavelength channel having a central wavelength and dispersion characteristics;
   dispersion tuning means for tuning the dispersion characteristics of the wavelength channels; and
   wavelength shifting means for uniformly shifting the central wavelengths of all of said wavelength channels independently of the dispersion characteristics thereof.

2. The colorless tunable dispersion compensator according to claim 1, wherein the wavelength channels of the Bragg grating are evenly spaced.

3. The colorless tunable dispersion compensator according to claim 1, wherein the dispersion tuning means comprise a thermal gradient assembly for inducing a thermal gradient along the waveguide containing the Bragg grating.

4. The colorless tunable dispersion compensator according to claim 3, wherein the thermal gradient induced by the thermal gradient assembly varies linearly along said waveguide.

5. The colorless tunable dispersion compensator according to claim 3, wherein the thermal gradient induced by the thermal gradient assembly varies non-linearly along said waveguide.

6. The colorless tunable dispersion compensator according to claim 4, wherein the thermal gradient assembly comprises:
   an elongated heat conductive element having a cavity therealong receiving the waveguide in thermal contact with said elongated heat conductive element; and
   first and second heat pumping devices coupled to the heat conductive element at opposite ends thereof situated on either sides of the Bragg grating, the first and second heat pumping devices respectively applying different temperatures $T_1$ and $T_2$ to said heat conductive element.

7. The colorless tunable dispersion compensator according to claim 6, wherein the wavelength shifting means comprise said elongated heat conductive element and said heat pumping devices, the temperatures $T_1$ and $T_2$ applied by the heat pumping devices to the heat conductive element being selected to induce a uniform temperature change in the waveguide.

8. The colorless tunable dispersion compensator according to claim 6, wherein the wavelength shifting means comprise said elongated heat conductive element and said heat pumping devices, the waveguide being rigidly coupled to the heat conductive element on either sides of the Bragg grating and the temperatures $T_1$ and $T_2$ applied by the heat pumping devices to the heat conductive element being selected to induce a direct strain on the waveguide through a thermal expansion of the element conductive element.

9. The colorless tunable dispersion compensator according to claim 1, wherein the wavelength shifting means comprise a strain applying assembly for applying a uniform strain along the waveguide containing the Bragg grating.

10. The colorless tunable dispersion compensator according to claim 9, wherein the strain applying assembly comprises:
    a frame having opposite ends rigidly coupled to the waveguide at coupling points on either sides of the Bragg grating; and
    an actuator coupled to the frame for controllably changing a length of the frame between said coupling points, thereby inducing a direct strain on the fiber.

11. The colorless tunable dispersion compensator according to claim 10, wherein the actuator comprises:
    a thermal expansion member extending generally in parallel to said waveguide; and
    a heating mechanism coupled to the thermal expansion member for effecting a temperature change therein sufficient to change a length thereof through thermal expansion.

12. The colorless tunable dispersion compensator according to claim 10, wherein the actuator comprises a stepped motor and a lead screw.

13. The colorless tunable dispersion compensator according to claim 10, wherein the actuator comprises a piezoelectric element.

14. A colorless tunable dispersion compensator for compensating for chromatic dispersion in a light signal, the compensator comprising:
    a Bragg grating extending along a waveguide, said Bragg grating having a spectral response which includes a plurality of wavelength channels, each wavelength channel having a central wavelength and dispersion characteristics;
    a thermal gradient assembly for inducing a thermal gradient along the waveguide containing the Bragg grating; and
    a strain applying assembly for applying a uniform strain along the waveguide containing the Bragg grating.

15. The colorless tunable dispersion compensator according to claim 14, wherein the thermal gradient assembly comprises:
    an elongated heat conductive element having a cavity therealong receiving the waveguide in thermal contact with said elongated heat conductive element; and
    first and second heat pumping devices coupled to the heat conductive element at opposite ends thereof situated on either sides of the Bragg grating, the first and second heat pumping devices respectively applying different temperatures T1 and T2 to said heat conductive element.

16. The colorless tunable dispersion compensator according to claim 15, wherein the strain applying assembly comprises:
    a thermal expansion member having opposite ends rigidly coupled to the waveguide on either sides of the Bragg grating and outwardly of the first and second heat pumping devices; and
    a heating mechanism coupled to the thermal expansion member for effecting a temperature change therein sufficient to change a length thereof through thermal expansion.

* * * * *